United States Patent Office 3,525,699
Patented Aug. 25, 1970

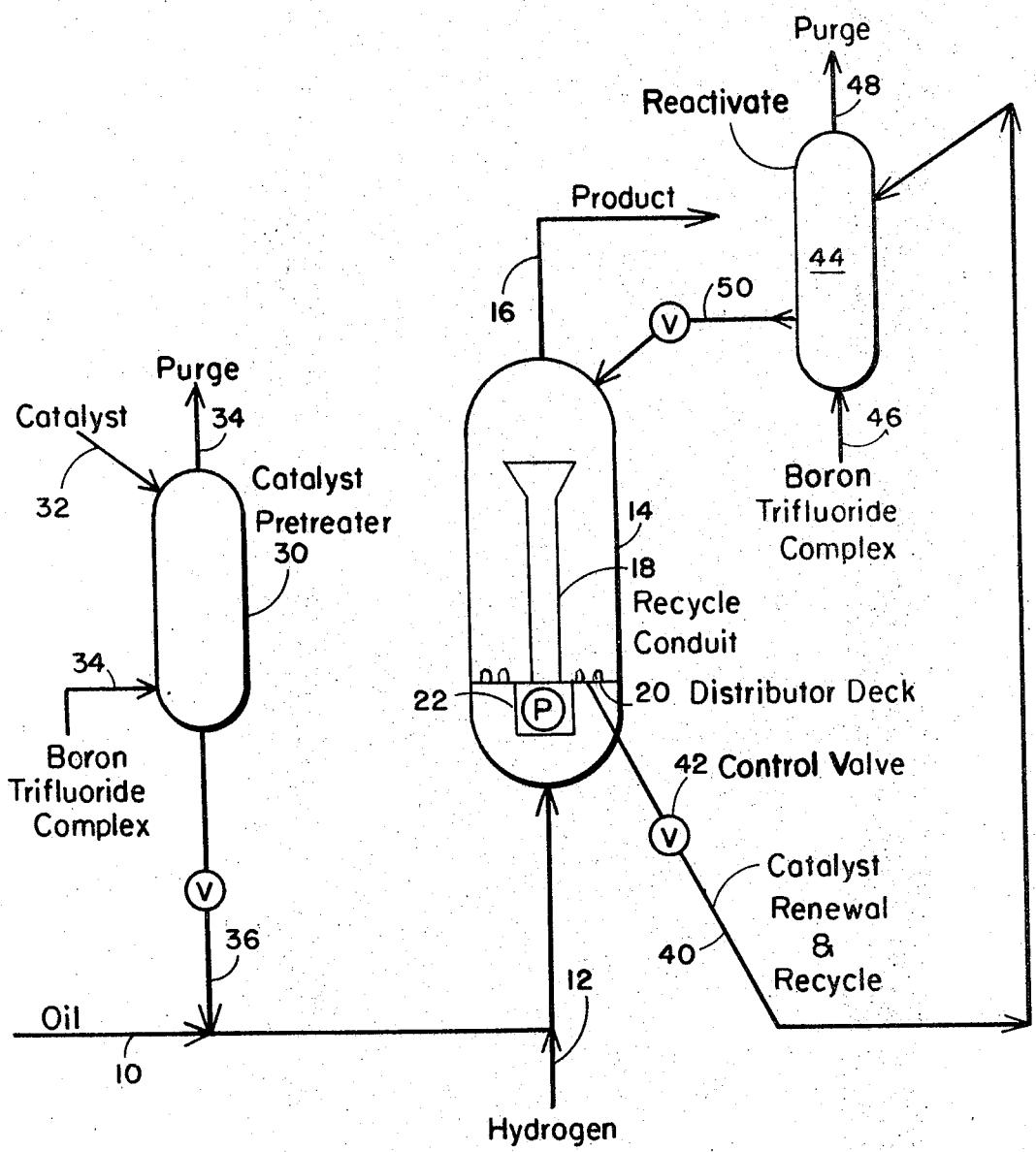

3,525,699
HYDROCRACKING WITH FLUORIDED CATALYST
Paul M. Koppel, Springfield, and Peter Maruhnic, Pennington, N.J., assignors to Hydrocarbon Research Inc., New York, N.Y., a corporation of New Jersey
Filed Nov. 13, 1967, Ser. No. 682,371
Int. Cl. C10g 13/02
U.S. Cl. 252—433                      1 Claim

ABSTRACT OF THE DISCLOSURE

A method for preparation of an acid site catalyst for use in catalytic hydrocracking of hydrocarbons from a typical alumina based hydrogenation catalyst by reacting the hydrogenation catalyst with a solution of boron-trifluoride etherate complex (BTFE) in benzene at reflux followed by a high temperature heating step under an inert atmosphere.

BACKGROUND OF THE INVENTION

Alumina base catalysts, usually impregnated with cobalt, or molybdenum or nickel or combinations thereof, are well known for hydrogenation of hydrocarbons and especially for hydrodesulfurization. Such catalysts have little effectiveness for hydrocracking however and usually an acid site catalyst such as silica-alumina is used when some cracking is desired. As compared to the single function hydrogenation (alumina base) catalysts, the hydrocracking catalysts are far more expensive and considerably shorter lived, being readily poisoned by contaminants in the hydrocarbons.

The use of boron trifluoride complexes for hydrodesulfurization has also been suggested. A complex of boron trifluoride with water, ether, etc., as suggested by Mason, U.S. Pat. 2,657,175, is formed in a reaction zone as a "homogeneous catalyst." However, this is not used to deposit Lewis acid sites on an otherwise inexpensive solid catalyst.

Yananot U.S. Pat. 3,128,243 has shown the use of boron trifluoride ($BF_3$) gas to prepare a fluorided nickel sulfide on alumina catalyst. The $BF_3$ is contacted with the unfluorided catalyst under pressure, preferably in situ, by passing the $BF_3$ gas into the hydrocracking zone simultaneously with the feed material to be treated.

It has been found however that use of any of the previously known methods for fluoriding hydrogenation catalysts results in a relatively poor uniformity of fluoride distribution through the catalysts, especially when it is desired to obtain a relatively low level of fluoride on the catalyst, e.g. about 2.0% by weight fluoride. Our invention is directed towards a method for preparation of a fluorided catalyst which allows one to achieve a highly uniform fluoride distribution and more importantly to produce a highly uniform fluoride content on the catalyst from batch to batch.

It is also known that as most hydrogenation reactions are highly exothermic, and frequently have problems of carbon deposit, catalyst poisoning, etc., the utilization of upflow, liquid phase reaction conditions by which the catalyst is maintained in random motion, avoids many of these prior problems. The Johanson patent, Re. 25,770, establishes the typical limits of such an operation.

SUMMARY OF THE INVENTION

In accordance with our invention, we now find it to be particularly effective to carry out a hydrocracking operation on hydrocarbon gas oils and distillates by operating liquid phase, upflow with a unique catalyst which has been impregnated with boron trifluoride in a particular manner as hereinafter described. This process results in a hydrocracking catalyst possessing a more uniform fluoride content than heretofore known and which although having a mono functional base, has proved to be equally or more effective than the far more costly dual function silica-alumina catalysts.

As an unexpected result of the activity of the impregnated catalyst, conversions are carried out at lower than usual temperatures with a material reduction in pour point and improved Diesel Index of the products as well as a higher ratio of furnace oil to naphtha.

The principal object of our invention is to make available, at low cost, a novel dual function catalyst which is particularly adapted for hydrocarbon hydrocracking.

Another object of our invention is to effectively hydrocrack distillate and gas oil hydrocarbons in the presence of a Lewis acid site catalyst.

BRIEF DESCRIPTION OF DRAWING

The drawing is a diagrammatic flow diagram of a refinery unit for hydrocracking distillates and gas oils and showing a pretreating operation by which the catalyst is impregnated.

DESCRIPTION OF THE INVENTION

A feed stock 10 is adapted to be hydrocracked with hydrogen at 12 in an upflow reactor 14 in the presence of catalyst. The reactor is of the type generally described in the aforesaid Johanson patent Re. 25,770, and by control of catalyst size, and liquid and gas velocities, the catalyst particles will be kept in random motion in the liquid and thereby substantially isothermal conditions can be maintained in the reactor.

Product (effluent) is removed overhead at 16 and where recycle is desired, it can be accomplished either by external piping (not shown) or by the internal recycle conduit 18 which extends below the distributor deck 20 and is provided with a circulating pump 22 also described in said Johanson patent.

Our invention is based on the production and use of a new catalyst in such a system. As a base material we use the well known and relatively inexpensive single function hydrogenation catalyst having an alumina base on which are deposited metals from the class consisting of cobalt, molybdenum, nickel molybdenum and the customary variants thereof. Such a catalyst in a close size range with a maximum dimension in the range of 3 mesh to 300 mesh (Tyler) enters catalyst pretreater 30 through line 32 and is impregnated by a boron trifluoride complex entering at 34. The impregnated catalyst removed at 36 thus becomes the catalyst for the reaction.

A typical example of fluoriding an alumina base catalyst with boron trifluoride is to use the etherate suitably dissolved (diluted) in benzene. The catalyst base, after drying as for example, at about 300° F. at atmospheric pressure, is processed through the following (preferred) steps:

Step A consists in diluting boron trifluoride etherate in benzene in a ratio of about 1:20 and then mixing about equal parts of the catalyst base with the diluted etherate. There is an exothermic reaction between the boron trifluoride and aluminum oxide, the exact nature of which is not known. This step is preferably continued for about thirty minutes and at about 180° F. Reflux temperature controls the exothermic reaction and is high enough at atmospheric pressure to break down the etherate and release boron trifluoride for reaction.

Step B consists in heating the catalyst and liquid up to about 600° F., in a suitably slow time period of about two hours, in the presence of nitrogen gas as a purge. It is found that the boron trifluoride is completely absorbed by and fixed onto the normally porous catalyst base. The temperature and purge drive off the ethyl ether which may be recovered.

Step C is a cooling step which accomplishes cooling to a suitable handling or storage temperature as for example, about 75° F. and this is effectively accomplished also by using a nitrogen gas purge which restrains any oxidation.

It was our observation that under these conditions the catalyst gained in weight approximately 3.2%. Fluoride analysis by the steam pyrolysis method was 2.3%. Analysis for boron spectrographically indicated it was present in the atomic ratio of 1B:3F.

It is considered by us that an essential element of this invention consists in the method used to react the boron trifluoride with the catalyst. It has been found that two steps are desirable for this fluoriding to be effective. The first step consists in a low temperature impregnation at the reflux temperature of benzene (180° F.) or some other suitable solvent.

The second step requires a temperature in the order of 600 to 700° F. to effect a complete impregnation and reaction of the boron trifluoride in the alumina oxide base. Heating to this temperature is especially necessary when a complex of boron trifluoride etherate is used as an alternate to boron trifluoride gas.

In the case that the liquid is used, it is necessary to break up the complex, freeing the ether to the atmosphere or recovery equipment and the boron trifluoride acid for reaction with the catalyst. A solvent for the first step is necessary so that the liquid boron trifluoride complex will be distributed uniformly throughout the catalyst. Such solvent must be non-viscous, low molecular weight, inert to boron trifluoride, ethyl ether and the catalyst, and easily removed by decanting and heating. Benzene is an example of an excellent solvent for use in this invention.

In our experimental work, we have found that the typical hydrogenation catalyst (alumina impregnated with cobalt molybdate or nickel molybdate) could be treated with boron trifluoride etherate to yield a fluorine content as high as 6.9 weight percent and 1.4 weight percent boron. This is accomplished by two or more complete cycles of drying the base, impregnating the base, heating the base to at least 600° F. and then cooling the base. However, we have found that these higher concentrations of boron and fluorine are not helpful in hydrocracking and we prefer to operate in the 2 to 4 weight percent, preferably 2.3 weight percent range for fluorine and with a boron content of about 0.85 weight percent.

It is of interest that the "fixing" of the boron trifluoride on the catalyst prevents normal loss of fluorine. Even with repeated washing and refluxing with hot (vaporized) benzene, there was no appreciable loss of the Lewis acid sites formed.

While we have found that the boron trifluoride can be deposited from the gaseous form, we also find that deposition is not as uniform nor as extensive as compared to the use of the boron trifluoride etherate, especially when diluted with benzene, and then fixed by heating to approximately 600° F. as above described.

A series of experiments was conducted to determine the dependence of the uniformity of fluoride application and content on the method in which the fluoride was applied to the catalyst and the compound from which the fluoride was derived. The following examples give the details of each of these particular experiments.

EXAMPLE I

Treatment of fresh catalyst samples with BTFE
(Treatment: 1/32" catalyst treated with BTFE)

| Ml. BTFE: | Wt. percent F. |
|---|---|
| 8.2 | 2.21 |
| 8.2 | 2.40 |
| 8.7 | 2.47 |
| 11.9 | 2.32 |
| 11.9 | 2.32 |

EXAMPLE II

Treatment of fresh catalyst samples with $PF_5$ (vapor) for 20 minutes

| Run No.: | Wt. percent F. |
|---|---|
| 1 | 1.3 |
| 2 | 5.5 |

EXAMPLE III

Successive treatment of the same catalyst sample with BTFE

| Ml. BTFE: | Wt. percent F. |
|---|---|
| 11.9 | 2.32 |
| +20 | 3.70 |
| +30 | 5.62 |
| +50 | 6.92 |

EXAMPLE IV

Successive treatments of the same catalyst sample with benzotrifluoride ($BzF_3$)

| Ml. $BzF_3$: | Wt. percent F. |
|---|---|
| 8.2 | 0.82 |
| +8.2 | 1.2 |
| +8.2 | 1.5 |

EXAMPLE V

Analysis of same sample treated with HF (vapor) in a tube

| | Wt. percent F. |
|---|---|
| Top | 4.87 |
| Bottom | 20.4 |

Example I shows the results obtained in the treatment of several fresh catalyst samples with varying amounts of boron trifluoride etherate solutions. In particular, the uniformity of the weight percent fluoride deposited in each preparative run shows that variations in the amount of boron trifluoride etherate in a given preparation has little or no effect on the fluoride deposition for that particular treatment. This is important in that it shows that the amount of boron trifluoride etherate is not critical and that excellent uniformity can be achieved from batch to batch in the fluoriding of catalyst by the use of such a process.

Example II on the other hand shows the results from treatment of two samples of fresh catalyst with phosphorous pentafluoride vapor for twenty minutes. As can be seen with this particular compound, even when the amount of fluoride compound is kept constant from batch to batch, severe deviations occur in the amount of fluoride deposited on the catalyst. This sort of nonuniformity has been seen with other type fluoride donors such as boron trifluoride in the gaseous state, hydrogen fluoride, etc.

Example III shows the results from successive treatment of the same catalyst sample with additional amounts of boron trifluoride etherate. This example particularly shows the manner in which the amount of fluoride deposited on a catalyst can be very evenly and easily controlled simply by successive treatments of that same catalyst with the etherate complex. As shown, with a single treatment using 11.9 milliliters of boron trifluoride etherate, we obtained a 2.32 weight percent fluoride deposited on the catalyst. Upon treating that same catalyst after the first treatment with a second treatment using 20 ml. of boron trifluoride etherate, the amount of fluoride deposited on the catalyst was raised to 3.70 weight percent and with successive treatments of 30 and 50 ml. of boron trifluoride etherate solution, the fluoride content was raised to 5.62 and 6.92 weight percent fluoride respectively. The importance of this characteristic of the boron trifluoride etherate treatment becomes more explicit when contrasted with the results obtained in Example IV where the same catalyst was successively treated with samples of benzotrifluoride. In this case the initial treatment of the catalyst gave a weight percent of fluoride on the catalyst of only 0.82 which is somewhat below the amount that would normally be desired. With two successive treatments of 8.2 ml. each of benzotrifluoride, the weight percent fluoride on the catalyst could be raised to 1.2 and 1.5 weight percent respectively. This is a small increase and in order to get into the higher fluoride contents that would normally be used, it would require quite a number of successive treatments with this particular fluoride compound before one could get into a practical range of fluoride content. As pointed out in Example III a much more rapid increase in fluoride content can be achieved using the boron trifluoride etherate solution so that it would not take nearly as many successive treatments with this fluoride compound to achieve the desired fluoride content in the catalyst as it would with compounds of the type of benzotrifluoride.

Example V shows the problems that occur with the fluoriding of catalyst using a vapor type treatment and in particular, treatment with hydrogen fluoride gas in a tube. A severe differential fluoride deposition occurs from the gas inlet part of the tube through to the gas outlet producing as a result a gradient fluoride content throughout the catalyst. As shown in this example, the fluoride content at the bottom or inlet side of the treatment tube was five times that at the outlet of the tube. Such nonuniformities of fluoride deposit are typical with the use of a vapor treatment. This does not occur using boron trifluoride etherate and thus is a major advantage in the use of our invention. The use of normally vaporous material such as boron trifluoride has been disclosed wherein the vapor is dissolved in a liquid such as benzene. Such solution, however, can be affected only at relatively high pressures and the treatment of a catalyst under such conditions becomes quite cumbersome. It is important to note that the dissolution of boron trifluoride in an organic solvent as postulated in the Yananot patent gives a typical solution of a gas in a liquid whereas when boron trifluoride is dissolved in ether, a complex is formed rather than simply a solution. Boron trifluoride is released from the etherate complex somewhat more slowly than it would be released if it were just in the dissolved state and this complex formation is undoubtedly the major reason for the improved uniformity of deposition that we have found with our process.

The use of boron trifluoride is an essential element of the invention. As is known, boron trifluoride, by virtue of the fact that it can accept a free electron pair on the boron atom is classified among those compounds termed Lewis acids. It appears to be due to these Lewis acid sites thus imparted to the alumina base catalyst that the catalyst exhibits a higher degree of cracking activity than the untreated alumina base catalysts and, in fact, much the same as the silica-alumina type catalysts. Not only is it thus possible to obtain middle distillate pour points of $-35$ to $-45°$ F., but the fluorided alumina catalyst allows lower operating temperatures (785° F. compared to 825° F.). Whether the reduced pour point results from the lower operating temperature or the acidic function imparted to the catalyst is not presently known. It is likely that the acidic property of the catalyst is responsible for both lower operating temperatures and more extensive isomerization, one prerequisite for low pour points.

As a result of the fluoriding of the inexpensive base alumina catalyst, it is also found that a very substantial saving in catalyst cost is obtained as compared to commercially available silica-alumina catalysts that compare in results.

Boron trifluoride is available in large (commercial) quantities as a gas and the etherate is readily made by dissolving the gas in ethyl ether.

In a hydrocracking operation using the typical silica-alumina or acid site catalyst, temperatures are usually in the order of 780° F. and at a pressure of about 1900 p.s.i.g. We find, however, that when the impregnated catalyst has between about 2 and 4 weight percent of fluorine (and preferably at least 2.3 weight percent), we have a particularly effective reaction.

Typical runs follow with a heavy coker distillate as feedstock:

TABLE I

|  | Non-fluorided | Fluorided |
|---|---|---|
| Run numbers | 84-135 | [1] 144-48 |
| Charge stock | [2] | [3] |
| Catalyst | [4] | [5] |
| Temperature, ° F. | 780 | 780 |
| Pressure (p.s.i.g.) | 1,900 | 1,900 |
| LHSV, $V_f$/hr./$V_r$ | .18 | .28 |
| $H_2$/oil ratio s.c.f./bbl | 15,500 | 21,000 |
| Internal recycle, oil/FF vol. ratio | 1.96 | 2.34 |
| External recycle, 650° F.+/FF | 3.2 | 3.0 |
| Total yields: |  |  |
| $CH_4$ | 1.29 | .97 |
| $C_2H_6$ | .97 | 1.68 |
| $C_3H_8$ | 1.58 | 1.60 |
| $C_1$-$C_3$ | 3.84 | 4.25 |
| $C_4$-$C_6$ vol. percent FF | 9.3 | 3.9 |
| $H_2S$ |  | 4.2 |
| IBP-330 | 34.8 | 16.1 |
| 330-400 | 15.2 | 9.7 |
| 400-650 | 53.2 | 59.1 |
| 650° F.+ | 5.4 | 22.5 |
| $C_4$+ | 117.9 | 111.3 |
| Conversion 400° F.+ | 46 | 24 |
| Vol. percent liquid 650° F.+ | 95 | 79 |

[1] Period A.
[2] Heavy coker distillate.
[3] 9° API.
[4] Silica-alumina 1/32" extrudate.
[5] HDS 3A with 2.3% Fl.

In a hydrocracking run using a typical alumina base catalyst, temperatures are usually between 825–850° F. We find, however, that when the typical catalyst has been impregnated with boron trifluoride (2.3% fluorine), we have a particularly effective reaction.

TABLE II

|  | Non-fluorided | Fluorided |
|---|---|---|
| Run numbers | 144-24 | [1] |
| Charge stock, 22° API straight run gas oil |  |  |
| Catalyst | [2] | [3] |
| Temperature, ° F.: |  |  |
| Inlet | 762 | 776 |
| Middle | 854 | 780 |
| Pressure, p.s.i.g. | 1,900 | 1,900 |
| LHSV, $V_f$/hr./$V_r$ | .45 | .39 |
| $H_2$/oil rates (s.c.f./bbl.) | 9,200 | 12,0000 |
| Internal recycle | 172 | 170 |
| External recycle | 0.5 | 2.2 |
| Total yields: |  |  |
| $CH_4$ | 1.03 | 0.40 |
| $C_2H_6$ | 1.15 | 0.75 |
| $C_3H_8$ | 1.96 | .96 |
| $C_1$-$C_3$ | 4.14 | 2.11 |
| $C_{4s}$-$C_{6s}$ gas V percent FF | 1.8 | 1.0 |
| $H_2S$ | 3.1 | 2.8 |
| $C_5$-180 | 7.1 | 1.3 |
| 180-350 | 26.1 | 24.1 |
| 350-400 | 6.5 | 14.2 |
| 400-650 | 58.4 | 58.0 |
| 650+ | 10.0 | 13.1 |
| $C_4$+ | 109.9 | 111.7 |
| $C_5$+ | 108.1 | 110.7 |
| S | <0.07 | <0.07 |

[1] 144-48, Period B.  [2] 1/32" Nalcomo.  [3] HDS3A+2.3 Fl.

Comparison with alumina base catalyst (Table II)

One of the most significant results of the fluoride treatment is the materially lowering of the pour point of the furnace oil fraction. While a normal catalyst will give a pour point of about 0° F., there was evidence to show that a pour point of $-35°$ F. could be obtained on a regular basis using the fluorided catalyst.

The lower temperatures (780° F. vs. 845° F.) also materially contribute to higher iso/normal ratios of the $C_4$'s and $C_5$'s in the gas, and a higher diesel index for the 400–650° F. fraction.

Comparison with silica-alumina catalyst (Table I)

With a 9° API coker distillate, the furnace oil/naphtha ratio was twice that of the far more expensive hydrocracking catalyst (see Table I). The $C_4$-$C_6$ yield in the gas is reduced in half. (With lower $C_4$-$C_6$ yields there is a reduction in the overall liquid yield, V% fresh feed.)

Other characteristics of diesel index, denitrogenation and desulfurization are about equal. Activity for conversion of the fluorided catalyst is about the same as the usual silica alumina catalyst.

In summary, we have found that the pretreatment of an alumina base hydrocracking catalyst with boron trifluoride etherate to give a deposit of aproximately 2.3 weight percent fluorine will permit:

(a) operations at lower temperature, i.e., 780° F. vs. 845° F.; (Table II);
(b) will produce a lower pour point, i.e., −35° F. vs. 0° F.;
(c) give substantially higher iso to normal ratios of $C_4$'s and $C_5$'s in gas;
(d) gives higher diesel index of the 400°–650° F. fraction, or operating at same temperature (780° F.) and pressures (Table I);
(e) double the furnace oil/naphtha ratio;
(f) reduce by about fifty percent the $C_4$–$C_6$ gas yield;
(g) lower liquid yield;
(h) lower hydrogen consumption.

With the usual hydrocracking operations, it is found that the effectiveness of the catalyst tends to diminish and regeneration or replacement is required. This is readily accomplished in our system for catalyst may be withdrawn from reactor 14 through conduit 40 under control of valve 42 and introduced to reactor 44. As in the case of catalyst pretreater 30, boron trifluoride complex will enter as at 46 with a gas purge at 48. The regenerated catalyst at 50 will then be restored to the system.

In addition, we have found that the use of boron trifluoride etherate complex to produce a catalyst with a fluoride content in the ranges described above results in increased uniformity of fluoride deposition on the catalyst than known heretofore with other type fluoriding agents whether the uniformity be measured batch to batch or within a single batch of catalyst. The process as described above represents a much more facile method of fluoriding a catalyst and also affords a degree of control that was heretofore unobtainable.

While we have shown and described a preferred form of embodiment of our invention, we are aware that modifications may be made thereto within the scope and spirit of the description herein and of the claim appended hereto.

We claim:

1. The method of producing a particulate hydrocracking catalyst having a close average size and a maximum dimension in the range of 3 mesh to 300 mesh (Tyler), said catalyst having a single function alumina support on which is deposited a metal selected from the group consisting of molybdenum, cobalt, titanium, nickel and combinations thereof, said coated support having impregnated Lewis acid sites thereon said method comprising:

(a) contacting said catalyst coated support with a liquid boron trifluoride etherate complex dissolved and diluted with benzene until said catalyst coated support shows from about 2.0–4.0 weight percent of fluorine having a 1:3 atomic ratio of boron to fluorine; and
(b) fixing said complex on said catalyst coated support by heating slowly to at least 600° F. under an inert atmosphere.

References Cited
UNITED STATES PATENTS

| | | | |
|---|---|---|---|
| 2,520,439 | 8/1950 | Sailors | 260—683.57 |
| 2,849,382 | 8/1958 | Hirschler | 208—116 |
| 3,113,844 | 12/1963 | Hemminger | 208—115 |
| 3,368,965 | 2/1968 | Schuman | 208—112 |

DELBERT E. GANTZ, Primary Examiner

A. RIMENS, Assistant Examiner

U.S. Cl. X.R.

208—112; 260—683.57